May 17, 1966 E. F. KRENGLICKI 3,251,592
KEYWAY HORN
Filed Sept. 30, 1963
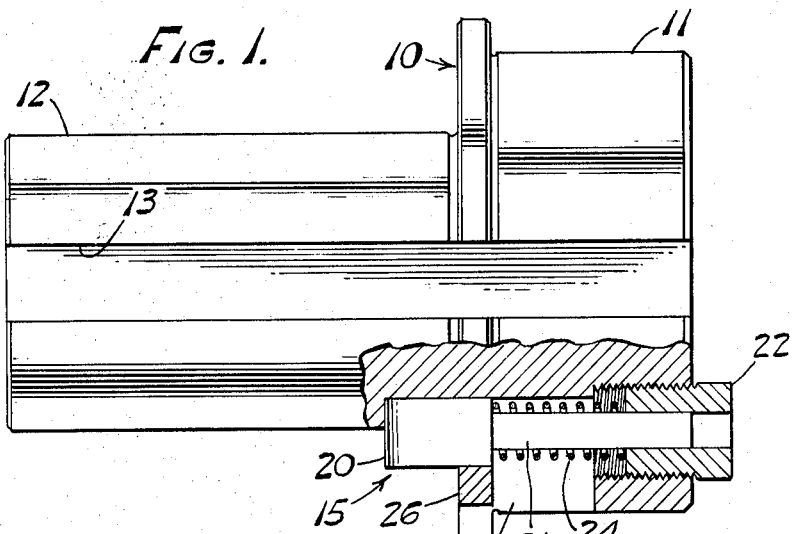
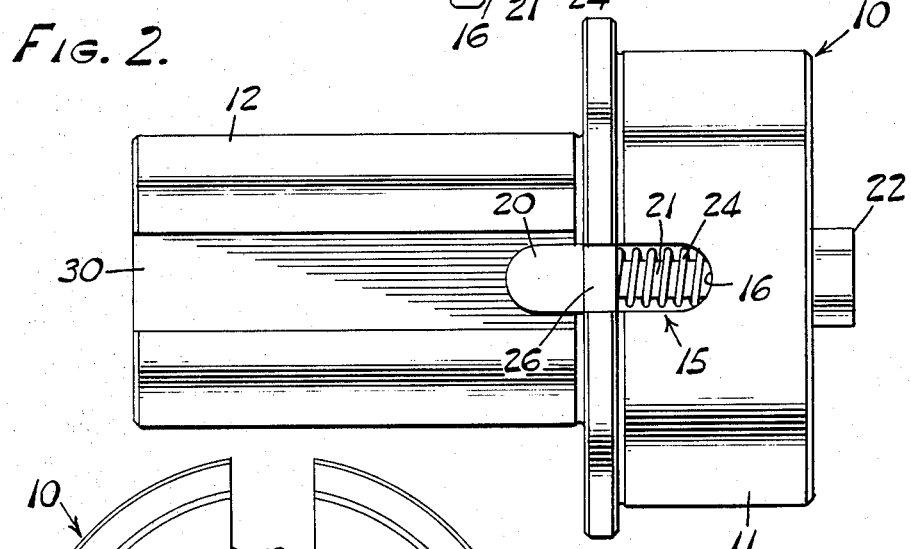
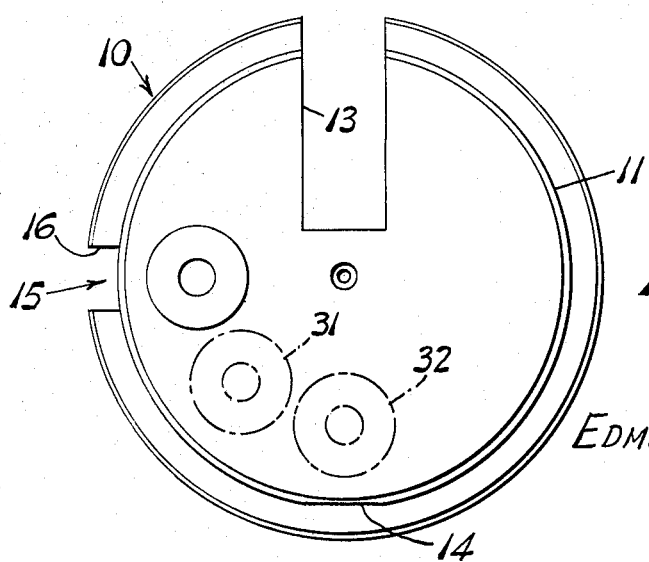
INVENTOR.
EDMUND F. KRENGLICKI
BY
Christel & Bean
ATTORNEYS

United States Patent Office 3,251,592
Patented May 17, 1966

3,251,592
KEYWAY HORN
Edmund F. Krenglicki, Springville, N.Y., assignor to Winsmith Division of Universal Match Corporation, Springville, N.Y.
Filed Sept. 30, 1963, Ser. No. 312,433
7 Claims. (Cl. 269—47)

This invention relates to work holding fixtures and particularly to fixtures for holding annular work pieces in accurate angular positions for successively forming a plurality of keyways or spline formations therein.

In forming a plurality of keyways in a work piece it is generally essential that the keyways be spaced at accurate angular distances and it is generally necessary to lay out the keyway locations on the work piece by scribing or the like to achieve this result, particularly in relatively low volume production. The present invention provides a simple fixture for receiving annular work pieces and supporting them in successive angular positions while keyways or similar formations are broached or otherwise formed therein.

Fixtures constructed according to the present invention may be arranged to locate workpieces for successive keyway broaching at a given angular spacing or the fixture may be arranged so that various angular spacings may be selectively employed. The fixture of the present invention is extremely simple and economical to manufacture and is particularly useful for keyway forming operations wherein only moderate production of duplicate work pieces is contemplated.

In fact fixtures according to the present invention may be available in a machine shop tool room in various sizes and effectively and efficiently employed as needed where only a single work piece or only a small number of duplicate work pieces having multiple keyways are required at a given time.

Various objects and advantages which are incident to employing the tool of the present invention will occur to those skilled in the mechanical arts from a consideration of a typical form of the invention which is illustrated in the accompanying drawing and described in the following specification. However, it is to be understood that this embodiment is by way of example only and that various modifications may be made therein without departing from the spirit of the present invention, the scope of which is limited only as defined in the appended claims.

In the drawing:

FIG. 1 is a side elevational view of one form of the work holding fixture of the present invention with a portion thereof shown in cross section;

FIG. 2 is a side elevational view of the fixture taken at right angles to FIG. 1; and FIG. 3 is an end elevational view from the right hand end as viewed in FIGS. 1 and 2.

In the drawing, like characters of reference denote like parts and the main body member of the device, which is generally cylindrical in form, is designated 10. Body member 10 has a cylindrical end portion 11 which is adapted to be clamped in a broaching machine in a manner well known to those skilled in the machine tool art. The end portion 11 of body member 10 may assume other forms for securement in or to portions of various machine tools capable of machining keyways, splines and similar formations, such as a milling machine or shaper. In the present instance a flat 14 is formed on portion 11 to receive a set screw for holding the tool in a broaching machine.

The opposite end portion of body member 10 is designated 12 and comprises a cylindrical mandrel or arbor for receiving annular work pieces such as gears, pulleys and the like in which keyways are to be formed, as for instance by broaching. In the present embodiment a groove 13 extends longitudinally through the body member 10 to provide space for the passage of a broach or similar keyway forming tool.

By way of illustration, the tool of the present invention is shown in the drawing as designed to form two or more keyways spaced ninety degrees apart. Accordingly, a locating mechanism designated generally by the numeral 15 is located ninety degrees distant from the broach clearance groove 13. The locating mechanism 15 is disposed generally in a slot 16 which extends along the adjacent ends of cylindrical portions 11 and 12 of the body member.

A slidable locating key 20 is disposed in slot 16 and has a stem 21 which is slidable in a nut 22 threaded into the end face of end portion 11 of the body member. The left hand end of key 20 as viewed in FIGS. 1 and 2 is rounded as shown to fit the adjacent end of slot 16. A compression coil spring 24 is disposed about stem 21 and acts between key 20 and nut 22 to urge the key 20 outwardly, that is, to the left as viewed in FIGS. 1 and 2. Nut 22 permits adjustment of the pressure of spring 24 against key 20.

In FIGS. 1 and 2 the numeral 26 designates a portion of the body member 10 which extends across the outer face of sliding key 20 and thus retains the same securely in the bottom of slot 16.

Formation of a pair of keyways spaced 90° apart is as follows. A workpiece such as a gear, a pulley, or any other annular member which is to be provided with internal keyways in its bore portion is placed on arbor 12 at random and a keyway is broached or otherwise formed by passing a broach or similar cutting tool through slot 13. In initially placing the work piece on arbor 12 the right-hand face of the work piece as viewed in FIGS. 1 and 2 bears against key 20 and slides the same to the right out of the way against the resistance of spring 24.

After a first keyway has thus been formed the work piece is replaced on arbor 12 with the formed keyway in registry with key 20 and the work piece is again moved to the right with the key 20 entering the formed keyway. This locates the work accurately for the formation of a second keyway spaced accurately from the first keyway, in the present instance, at 90°. A flat 30 is preferably formed along the periphery of arbor 12 at the locating mechanism 15 so that if the first keyway has burrs along its edge such burrs will not interfere with proper positioning of the work piece on arbor 12.

It is to be understood that instead of locating the sliding key 20 at 90° from the groove 13 the same may be located at any other angle as indicated, for instance, at 31 and 32 in FIG. 3 wherein the sliding key locating mechanisms are spaced respectively 135° and 180° from the groove 13 where the keyways are formed.

Furthermore, a single tool may be provided with several of the locating mechanisms 15 disposed at various angles. For instance, in addition to the locating mechanism 15 illustrated in FIGS. 1 and 2, and partially in full lines in FIG. 3, duplicate locating mechanisms 15 may be located at 31 and 32. In this case initial placement of a work piece on the mandrel or arbor 12 will depress three yieldable locating keys 20. After a first keyway has been cut the workman may select any of the three available locating keys 20 for placement of the work piece to form a second keyway and, if desired, a third and even a fourth keyway, in a given work piece.

I claim:

1. Means for positioning an annular workpiece in a succession of angular positions about its axis for forming internal keyways spaced at predetermined angles thereto, said means comprising a work receiving mandrel having an enlarged annular shoulder at an end thereof, a longitudinal groove in the surface of said mandrel extending throughout the length thereof for longitudinal passage of a keyway forming tool, a keyway in said mandrel and extending longitudinally into said shoulder, said keyway being spaced at a predetermined angle from said channel, a key in said keyway slidable between projected and withdrawn positions with respect to the mandrel portion of said keyway, and resilient means urging said key to projected position whereby said key may be moved into said shoulder by engagement of a workpiece thereagainst or may enter a keyway in such workpiece to locate the same for formation of a second keyway through said channel.

2. Means for positioning an annular workpiece in a succession of angular positions for forming internal keyways spaced at predetermined angles therein, said means comprising a work receiving mandrel having an enlarged annular shoulder at an end thereof, a longitudinal groove in the surface of said mandrel extending throughout the length thereof for longitudinal passage of a keyway forming tool, a sliding key adapted to project through said shoulder toward said mandrel and movable longitudinally between projected and withdrawn positions with respect to said mandrel, said key being spaced at a predetermined angle from said channel and radially located to enter a keyway in said workpiece, and resilient means urging said key yieldably to projected position whereby said key may be moved into said shoulder by a workpiece as the workpiece is moved onto said mandrel or may enter a previously formed keyway in such workpiece to locate the workpiece for formation of a second keyway spaced at said predetermined angle from the previously formed keyway.

3. A keyway horn for broaching machines comprising a generally cylindrical body member having one end thereof engageable in said machine and the opposite end comprising a work receiving mandrel, an enlarged annular shoulder between said ends, a groove in the surface of said horn extending longitudinally throughout said keyway horn to permit longitudinal passage of a keyway broach, a keyway in said horn extending longitudinally into adjacent portions of said mandrel and said shoulder, said keyway being spaced at a predetermined angle from said channel, a key in said keyway slidable between projected and withdrawn positions with respect to the mandrel portion of said keyway, and resilient means urging said key yieldably to projected position whereby said key may be moved into said shoulder by engagement of a workpiece thereagainst or may enter a previously broached keyway in such workpiece to locate the workpiece for broaching a second keyway through said channel.

4. A keyway horn for broaching machines comprising a generally cylindrical body member having one end thereof engageable in said machine and the opposite end comprising a work receiving mandrel, an enlarged annular shoulder between said ends, a groove in the surface of said horn extending longitudinally throughout said keyway horn to permit longitudinal passage of a keyway broach, a sliding key adapted to project through said shoulder toward said mandrel and movable longitudinally between projected and withdrawn positions with respect to said mandrel, said key being spaced at a predetermined angle from said channel and radially located to enter a keyway in said workpiece, and resilient means urging said key yieldably to projected position whereby said key may be moved into said shoulder by engagement of a workpiece thereagainst or may enter a previously broached keyway in such workpiece to locate the workpiece for broaching a second keyway through said channel.

5. Means for positioning an annular workpiece in a succession of angular positions for forming internal keyways spaced at predetermined angles therein, said means comprising a work receiving mandrel having an enlarged annular shoulder at an end thereof, a longitudinal groove in the surface of said mandrel extending longitudinally throughout said mandrel for longitudinal passage of a keyway forming tool, a plurality of spaced sliding keys adapted to project through said shoulder toward said mandrel and movable longitudinally between projected and withdrawn positions with respect to said mandrel, said keys being spaced at predetermined angles from said channel and radially located to enter a keyway in said workpiece, and resilient means urging each of said keys yieldably to projected position whereby said keys may be moved into said shoulder by a workpiece as the workpiece is moved onto said mandrel and whereby a desired one of said keys may enter a previously formed keyway in such workpiece to locate the workpiece for formation of a second keyway spaced at one of said predetermined angles from the previously formed keyway.

6. Means for positioning an annular workpiece in a succession of angular positions about its axis for forming internal keyways spaced at predetermined angles thereto, said means comprising a work receiving mandrel having an enlarged annular shoulder at an end thereof, a longitudinal groove in the surface of said mandrel extending throughout said mandrel for longitudinal passage of a keyway forming tool, a plurality of angularly spaced keyways in said mandrel and extending longitudinally into said shoulder, said keyways being spaced at predetermined angles from said channel, a key in each of said keyways slidable between projected and withdrawn positions with respect to the mandrel portion of said keyway, and resilient means urging each of said keys to projected position whereby said keys may be moved into said shoulder by engagement of a workpiece thereagainst and whereby a desired one of said keys may enter a keyway in such workpiece to locate the same for formation of a second keyway through said channel.

7. Means for positioning an annular workpiece in a succession of angular positions about its axis for forming internal keyways spaced at predetermined angles therein, said means comprising a projecting work receiving mandrel having an enlarged annular shoulder at its inner end, a longitudinal groove in the surface of said mandrel extending throughout said mandrel and being shaped to permit longitudinal passage of a keyway forming tool, a keyway in said mandrel and extending longitudinally into said shoulder, said keyway being spaced at a predetermined angle from said shaped mandrel portion, a key in said keyway slidable between projected and withdrawn positions with respect to the mandrel portion of said keyway, and resilient means urging said key to projected position whereby said key may be moved into said shoulder by engagement of a workpiece thereagainst or may enter a keyway in such workpiece to locate the same for formation of a second keyway at said shaped mandrel portion channel.

References Cited by the Examiner
UNITED STATES PATENTS

| | | | |
|---|---|---|---|
| 187,131 | 2/1877 | Hall et al. | 269—70 |
| 1,111,203 | 9/1914 | Winston | 269—47 |
| 2,890,053 | 6/1959 | Walker | 279—1 |
| 3,031,995 | 5/1962 | Taylor | 269—48.1 |

HAROLD D. WHITEHEAD, *Primary Examiner.*